United States Patent [19]

Pilatzki

[11] 4,449,728

[45] May 22, 1984

[54] ANTI-CRASH APPARATUS FOR MOTORVEHICLES

[76] Inventor: Bernd Pilatzki, Franzstrasse 27, D-5000 Köln 41, Fed. Rep. of Germany

[21] Appl. No.: 328,859

[22] Filed: Dec. 9, 1981

[51] Int. Cl.³ .............................................. B60R 21/08
[52] U.S. Cl. ....................................... 280/731; 74/96; 280/743
[58] Field of Search .............. 280/728, 729, 730, 731, 280/732, 733, 734, 743; 74/96, 99 A, 99 R

[56] References Cited

U.S. PATENT DOCUMENTS

| 3,744,817 | 7/1973 | Ousset | 280/731 |
| 3,801,123 | 4/1974 | Jira | 280/734 |
| 3,863,948 | 2/1975 | Vancil | 280/731 |
| 3,879,056 | 4/1975 | Kawashima | 280/743 |
| 4,136,894 | 1/1979 | Ono | 280/729 |
| 4,290,627 | 9/1981 | Cumming | 280/732 |

Primary Examiner—David M. Mitchell
Assistant Examiner—Timothy Roesch
Attorney, Agent, or Firm—Michael J. Striker

[57] ABSTRACT

A anti-crash apparatus for motorvehicles with an airbag designed to be automatically inflated on deceleration of the vehicle being greater than a certain amount, the airbag being placed on the driver's side of a steering wheel shaft, which is at a slope of 10° to 60° to the horizontal within the steering wheel and on the driver's side of steering wheel spokes. The airbag is so placed and designed that, on inflation thereof, it takes up a position on the driver's side of a top third of the circumference of the steering wheel, its size measured in a direction normal to the plane of the steering wheel being less than 20 cm.

9 Claims, 4 Drawing Figures

ANTI-CRASH APPARATUS FOR MOTORVEHICLES

BACKGROUND OF THE INVENTION

The present invention is with respect to an anti-crash system for motorvehicles having an airbag designed to be automatically inflated when the vehicle is decelerated at more than a given rate, the airbag being placed between the driver and the back end of a steering shaft which is at an angle of about 10° to 60° to the horizontal, within the steering wheel and on the driver's side of the steering wheel spokes.

In a known anti-crash system on these general lines, see German Offenlegungsschrift specification No. 2,248,925, the folded-up airbag, designed to be inflated, and the gas generator are placed in an "impact" box (with a cushioning effect), which is placed at the top end of the sloping steering shaft within the steering wheel and on the driver's side of the steering wheel spokes. This known anti-crash system has the shortcoming that the airbag, on blowing up, is pushed violently against the driver's chest and into his face. The airbag then has a great volume so that while the body and head of the driver are, it is true, safeguarded, the driver is, however, not able to go on driving, the airbag being pushed at a high speed into his face so that he is not able to see straightforwards out of the car.

Because of these undesired and unpleasing effects, the system for triggering the gas generator has to have such an adjustment that it is only on a high rate of deceleration and, more specially, in the case of a heavy smash-up that gas is produced with an effect like an explosion, this in itself counting as a shortcoming because, in light collisions with a low deceleration rate, the airbag will not be inflated so that the driver's head will be moved violently against the steering wheel.

GENERAL OUTLINE OF THE INVENTION

One purpose of the present invention is that of putting an end to the shortcomings of the known anti-crash system, and designing a system which, while being generally uncomplex, makes certain of safeguarding the driver from being violetly pushed against the steering wheel.

For effecting this purpose and further purposes, the airbag is so placed and so designed that, when the airbag is inflated, it takes up a position generally in the top third of the circumference of the steering wheel and on the wheel, its size as measured in the direction normal to the plane of the steering wheel being less than 20 cm. Because of this design, it is possible to make certain that the airbag is not pushed violently into the face of the driver and, in fact, it is likely that, as a smash-up takes place, for the head of the driver to be pushed down against the inflated airbag and, for this reason, more or less softly cushioned.

As a useful, further development of the invention, the folded-together airbag is housed in a cushioning box, which, on the side opening towards the driver, has a cushioning cover able to be opened at its top edge. When the gas generator is put into operation, the cushioning plate or cover is forced open by the airbag at its top edge, the airbag then coming out as blowing up with gas from the generator takes place, in an upward direction, to take up a position like a bolster to the back of the top part of the steering wheel, that is to say between the driver and the steering wheel. Because the volume of the airbag may be generally small, the blowing up of the airbag till it is quite hard will have come to an end before there is any chance of the driver's head being violently pushed down onto the airbag. Because of the generally small volume of the airbag, blowing up may take place like an explosion without, on the other hand, there being any sharp increase in pressure inside the motorvehicle which might be the cause of injury to those in it.

As a further development of the invention, it is possible for the expansion of the airbag in an upward direction to be limited to such a degree that the driver is still able to see out of the car forwards. There is the useful effect in this case that the triggering system for the gas generator may be designed so as to be generally sensitive, because any wrong triggering of the airbag, when there has been no smash-up, will not have the effect of stopping the driver from driving the motorvehicle. It is best for the folded-up airbag, together with a gas generator, to be made into a single unit which may readily be placed in the cushioning box and taken out of it.

To make quite certain that, without being dependent on the position of the steering wheel, the airbag, in all cases, takes up a position to the back of the top part of the steering wheel, steps have to be taken to see that the cushioning box is not joined up with the steering wheel, the steering wheel hub or the steering wheel spokes and, in fact, the cushioning box has to be turningly supported within the hub of the steering wheel and stopped from turning within the steering wheel by a mechanical linking part or furthermore by magnetic forces. More specially, the cushioning box may be joined up by using at least two moving linking parts with a part of the motorvehicle which is fixed in position, the linking parts being able to be so moved by a driving part joined with the steering wheel that at least one linking part is in the linking position, while, for letting past a spoke of the steering wheel, a further linking part is moved out of its linking position.

Such a steering system has been put forward in the prior art, see European patent application No. 0009264. A steering system in the case of which the cushioning box with its instruments and controls is not turned with the steering wheel, that is to say it is locked to the rest of the vehicle, has furthermore been put forward in German Offenlegungsschrift specification No. 2,131,902. In the case of this system, the cushioning box, placed within the steering wheel, is fixedly joined to a part of the vehicle which is not turned with the steering wheel or the steering wheel is joined by way of planetary gearing with the steering shaft.

In addition to the airbag of the present invention, one may furthermore have a second airbag, of greater volume, housed within the cushioning box, its gas generator being triggered only by a more violent smash-up. This second airbag, which is inflated at a generally high pressure is such that the driver is stopped from seeing out of the vehicle and from going on driving, he is, however, safeguarded against fatal injuries.

Further details of the invention will be seen in the claims.

LIST OF FIGURES AND DETAILED ACCOUNT OF WORKING EXAMPLES OF THE INVENTION

In the account now to be given, details will be able to be seen of working examples of the invention using the figures.

Figure 1:
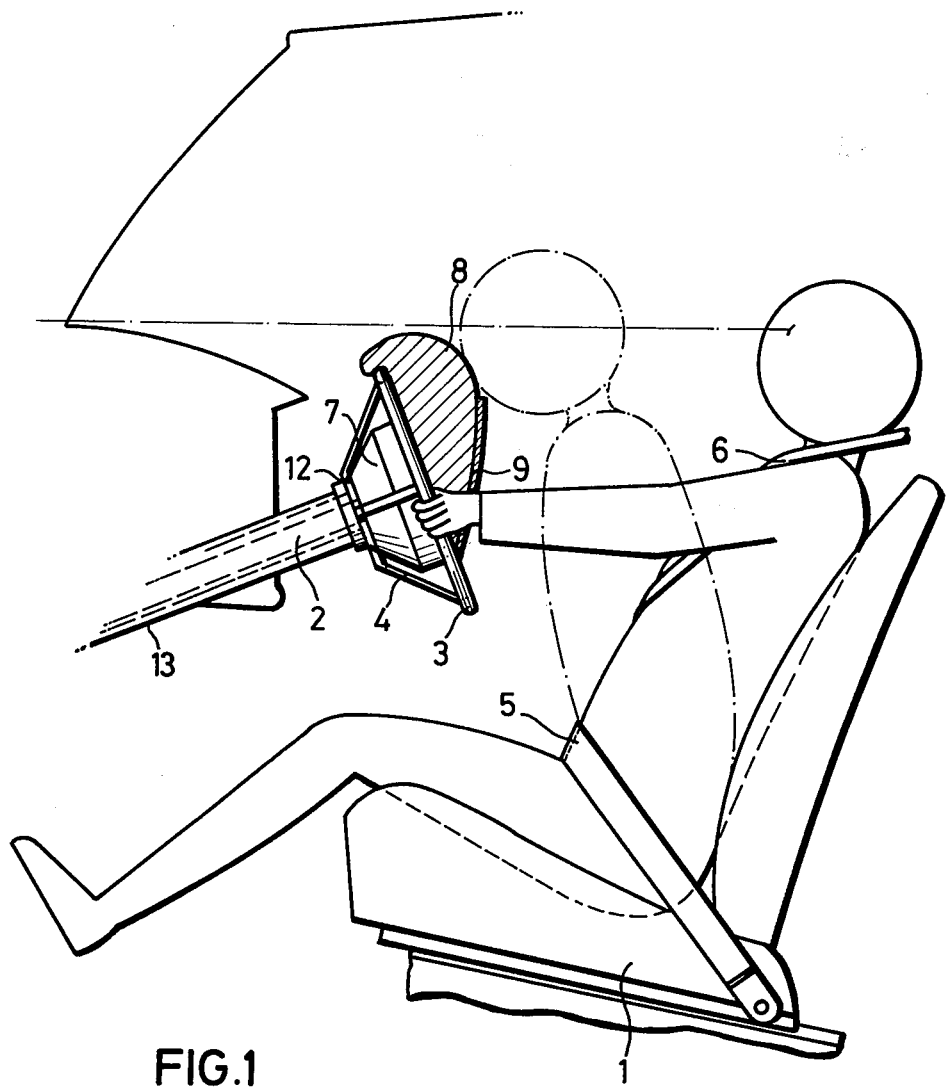
FIG. 1 is a view making clear the general idea of the anti-crash system of the present invention.

As will be seen from FIG. 1, the driver on the vehicle seat 1 is safeguarded by an anti-crash system, which is placed on the top end of a steering shaft 2, which is at an angle of 10° to 60° to the horizontal, within the steering wheel 3 and on the driver's side of the steering wheel spokes 4. The anti-crash system has an inflatable airbag 8, which is inflated when the motorvehicle is decelerated at a rate greater than a given amount. Airbag 8 and the gas generator are housed in a cushioning box 7, whose end or side facing towards the driver, is covered by a cushioning plate 9 designed to be opened at its top edge when the airbag 8 is inflated. On such inflation, the airbag takes up at once a position to the back of the top part of the steering wheel (on the driver's side thereof) so that, when the driver's head is moved forward in relation to the rest of the car when a smash-up takes place, there is no danger of the driver's head being pushed violently against the steering wheel 3. The driver, who is in addition safeguarded by the hip-level safety-belt 5 and the shoulder belt 6 will have his body pushed against the cushioning plate 9 which is supported by the cushioning box 7 which, in this case, would be forced together, that is to say when there is a heavy smash-up.

Figure 2:
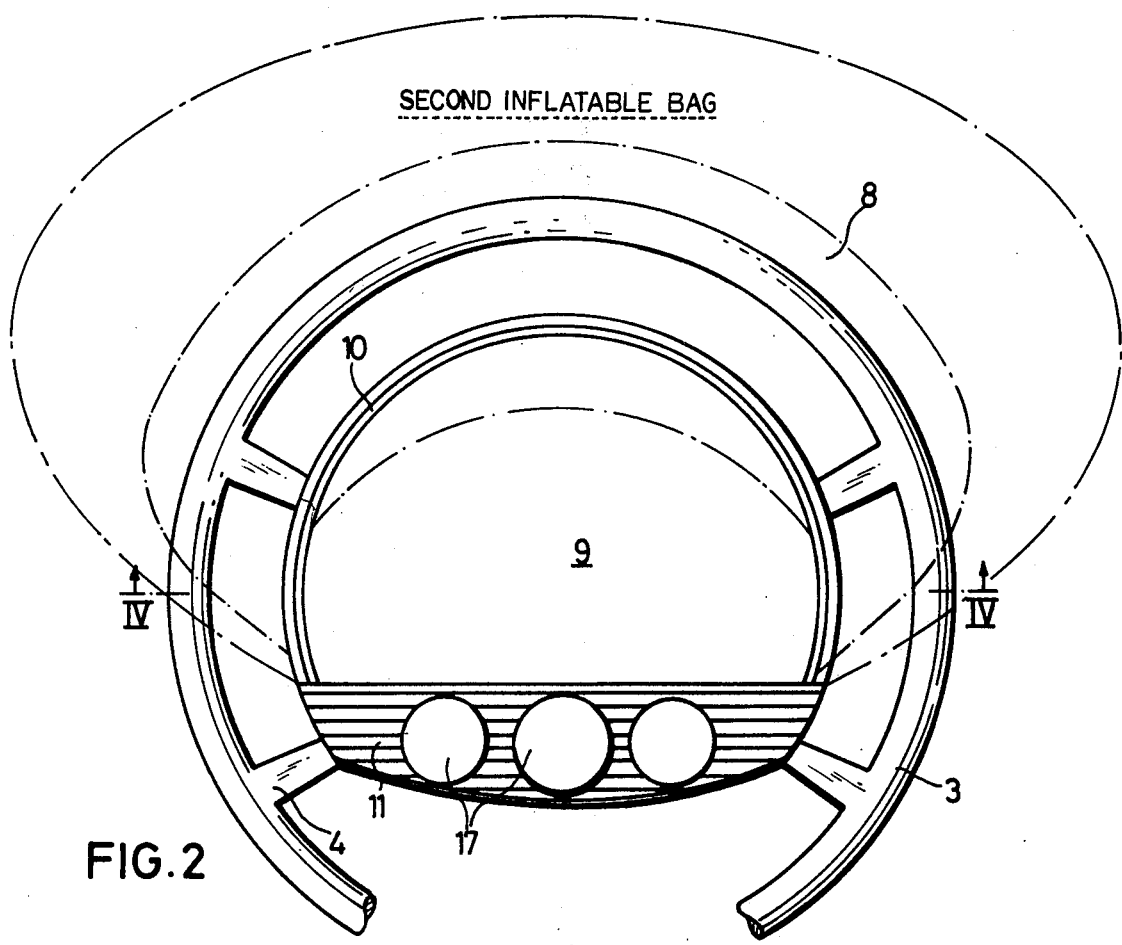
FIG. 2 is a driver's view of a steering wheel with the cushioning box and the airbag housed within it.

As will be seen from FIG. 2, the cushioning plate 9 has a line 10 of weakness at its top edge and when it is broken along this line 10, the cushioning plate 9 is folded like a hinge at its lower edge. Under the folding cushioning plate 9, there is a cushioning wall 11, in which controls as for example for switching the lights, operation of the horn, of the windscreen wiper or of the direction indicator in the form of sensor buttons 17 may be placed. Under the cushioning wall 11, which is not opened, electronic transmitters may be placed in the cushioning box 7, for transmission of signals coming from the sensor buttons 17.

The angle of opening of the cushioning plate 9 made of soft material is limited so that the airbag 8, on blowing with gas, takes up a position like a bolster on the driver's side of the top part of the steering wheel and, more specially, at a position to the back of the top third of the steering wheel 3. The angle of opening of the folding cushioning plate 9 may be limited, for example by nylon bands or the like.

Figure 3:
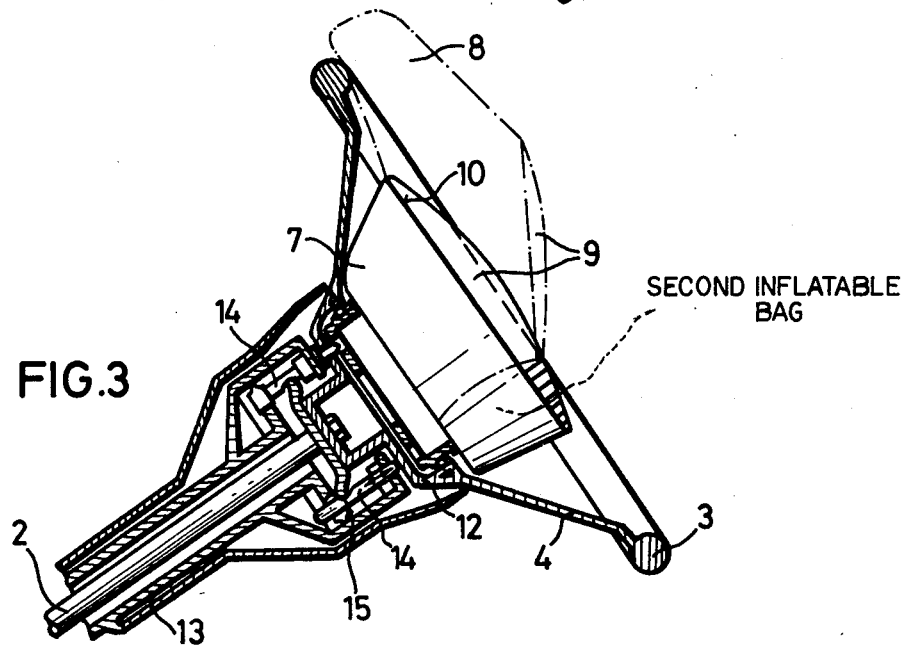
FIG. 3 is a section of the anti-crash system of FIG. 2.

As will be seen from FIG. 3, the cushioning box 7 is rotatably supported by rolling element bearings or plain bearings on the hub 12 of the steering wheel. Steering wheel hub 12 is keyed on the steering shaft 2 which is housed within a steering column casing 13 fixed to the vehicle. The steering wheel hub 12 is joined up by spokes 4 with the outer part of the steering wheel 3. To make certain that the cushioning box 7 is not turned when the steering wheel 3 is turned, the cushioning box 7 is kept in position by linking parts 14 for linking it with a part of the vehicle which is not turned with the steering wheel, that is to say the casing 13. In the working example figured, the linking parts 14 take the form of sliding pins slidingly supported in the top part of the steering casing 13 and which may be moved by a driving cam 15, joined with the steering shaft 2 into an unlocked position and into a locking position. In FIG. 3 the top linking pin 14 is to be seen in the locking or linking position in which it is taken up in a pocket or opening in the floor of the cushioning box 7. The lower linking pin 14, on the other hand, is moved so far axially by the cam face of the driving cam 15 that it is moved out of the way so that a lower spoke 4 of the steering wheel may be moved past it. The moving linking parts 14 are so out of line with the spokes 4 that, in all cases, one linking part will be in the linking position linking the cushioning box 7 with the steering shaft 13. The linking parts 14 may furthermore be so designed that they are kept by a spring in the linking position till they are pushed back into the unlocked position by the spokes 4.

Figure 4:
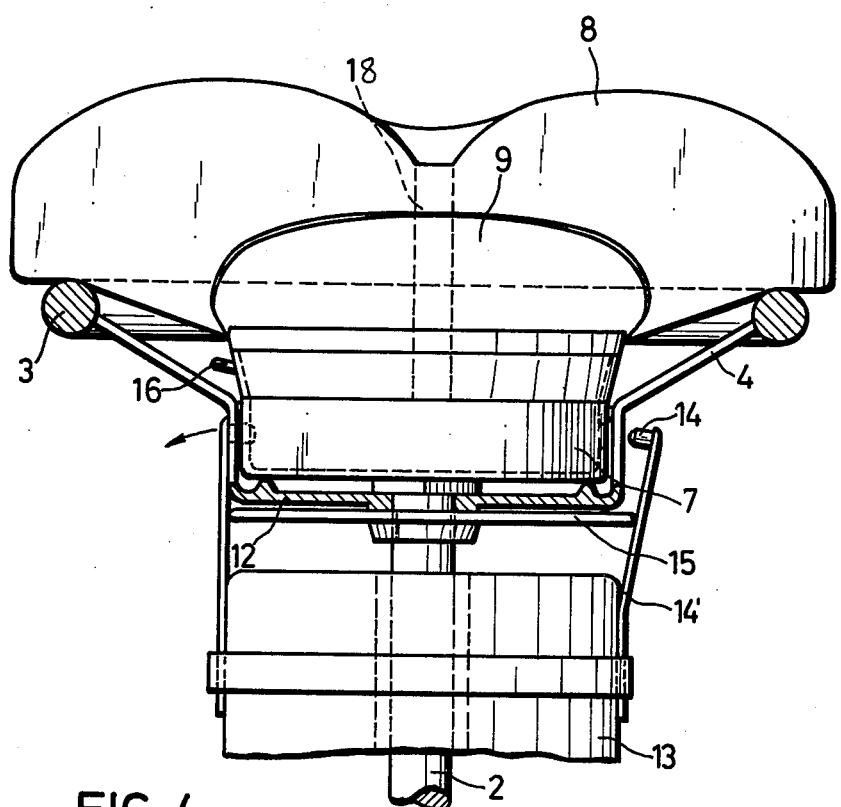
FIG. 4 is a view on the line IV—IV of FIG. 2 with the airbag in the inflated condition.

In the working example to be seen in FIG. 4, the cushioning box 7 is kept in position by linking parts 14, which are each placed at the end of a leaf spring 14', such springs being fixed to the top end of the steering column casing 13. The linking parts 14 are forced by a radially working driving cam 15 into the open or unlocked position when a spoke 4 goes past the position of locking.

The working example noted here will make it clear that the inflated airbag 8 is limited by ties 18, which may, for example, be nylon bands. These ties or distance pieces 18 make certain that the airbag 8 is not overly thick in the inflated condition and that in the middle part of the airbag 8, when full of gas under pressure, has a sort of valley for taking up, more specially, the driver's nose so that there is no violent force on the nose and little danger of the nose being broken in small smash-ups.

By opening a valve on the gas generator using valve switch 16, which is positioned on the outside of the cushioning box 7, it is possible for gas to be let off from the inflated airbag 8. After letting down the airbag 8, placing a new propellant charge in position for the gas generator and shutting the cushioning plate 9, the anti-crash system is ready for use again.

The wall of the gas-or airbag 8, placed on the top part of the steering wheel 3, for cushioning the head of the driver is best designed so that, when the airbag is full of air and quite tight, its wall is between 5 and 20 cm from the plane of the steering wheel.

I claim:

1. In an anticrash apparatus for motorvehicles with an airbag designed to be automatically inflated on deceleration of the vehicle being greater than a certain rate, the airbag being placed on the driver's side of a steering wheel shaft, which is at a slope of 10° to 60° to the horizontal, within the steering wheel and on the driver's side of a steering wheel spoke, the invention residing in that the airbag is so placed and designed that on inflation thereof, it takes up a position on the driver's side of a generally top third of the circumference of the steering wheel, its size measured in a direction normal to the plane of the steering wheel being less than 20 cm, a cushioning box is provided within the steering wheel for housing the folded-up airbag, and a part is provided which is fixed in relation to the rest of said vehicle and at least two linking parts for joining said cushioning box with said part, said linking part being designed to be moved by said steering wheel in such a way that at least one linking part is in its linking position all the time while an other linking part is moved back out of its linking position for letting past a spoke.

2. An anti-crash apparatus as claimed in claim 1, having a cushioning plate on the driver's side of such cushioning box, such plate being placed on an edge of said box on the driver's side thereof.

3. An anti-crash apparatus as claimed in claim 1, wherein said cushioning plate has a line of weakness next to the top edge thereof.

4. An anti-crash apparatus as claimed in claim 1, wherein possible expansion of said airbag is limited so that the driver may go on seeing out of the car past said airbag.

5. An anti-crash apparatus as claimed in claim 1, wherein at least one tie is placed within said airbag.

6. An anti-crash apparatus as claimed in claim 1, wherein at least one such tie is placed in a middle part of said airbag, said airbag being designed to take up a half-moon on blowing up.

7. An anti-crash apparatus as claimed in claim 1, wherein said airbag is so designed that in the inflated condition it takes up a position like a bolster on the driver's side of the greater part of the top half of said steering wheel.

8. An anti-crash apparatus as claimed in claim 2, wherein said steering wheel is keyed on said steering shaft.

9. An anti-crash apparatus as claimed in claim 1, having a second airbag, separate from said first noted airbag, and a system for causing blowing up of said second airbag automatically to a greater volume than said first airbag.

* * * * *